H. O. REESE.
ANIMAL TRAP.
APPLICATION FILED OCT. 4, 1910.
1,007,975.
Patented Nov. 7, 1911.
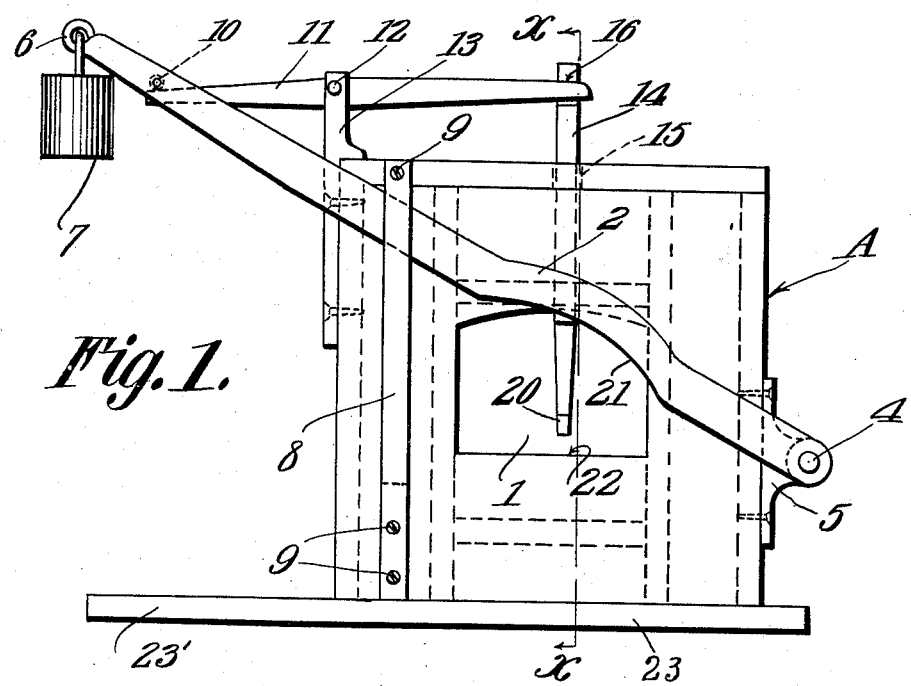
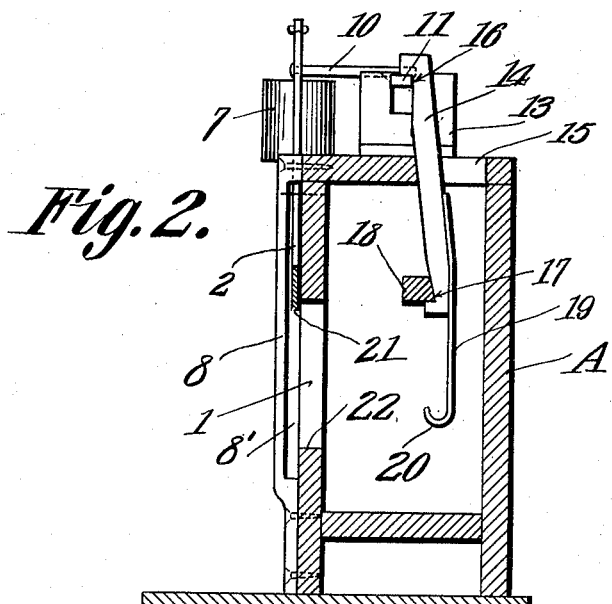
WITNESSES
Frank B. Wooden.
Justus Riehl
INVENTOR
Henry O. Reese,
By Henry S. Brewington.
Attorney

UNITED STATES PATENT OFFICE.

HENRY O. REESE, OF BALTIMORE, MARYLAND.

ANIMAL-TRAP.

1,007,975.      Specification of Letters Patent.      Patented Nov. 7, 1911.

Application filed October 4, 1910. Serial No. 585,191.

*To all whom it may concern:*

Be it known that I, HENRY O. REESE, a citizen of the United States, residing at Baltimore city, State of Maryland, have invented certain new and useful Improvements in Animal-Traps, of which the following is a specification.

My invention relates to an improvement in animal traps, and has for its object to provide a device of this character which is simple in construction and inexpensive to manufacture, and which will be certain and sure in its operation, and which may be set with ease, and is not likely to get out of order.

With the foregoing objects in view, my invention consists in certain novel features of construction, arrangement and combinations of parts which will be hereinafter described and pointed out in the claim.

Reference being had to the accompanying drawings forming a part of this specification, in which like letters of reference are used to indicate corresponding parts in the several views, Figure 1 is a view in front elevation of my invention, and Fig. 2 is a section taken on the line X—X of Fig. 1 and looking in the direction indicated by the arrows.

A, indicates the cage or body part, which may be of any suitable size, shape or construction, having reference to the particular kind of animals desired to be trapped, and made from any suitable material preferably wood, owing to its cheapness, and the facility by which it may be readily obtained.

1 indicates an opening or door way; 2 a lever transversely extended across the front of the cage, one end of the lever being pivotally secured at 4 to a bracket 5 secured on the cage. The lever 2 on its free end is provided with a hook or ring 6, into which is secured a weight 7.

8 indicates a vertically extended guide secured on the front of the cage by any suitable means, such as the screws 9, the guide forming a slot 8′ in which the lever 2 reciprocates.

Provided on the lever 2, near the end upon which the weight 7 is suspended, is a pin 10, adapted to engage with one end of a tripping lever 11, pivoted at 12, on a bracket 13, the opposite end of the lever engaging with a vertical trigger rod 14 which is extended through an opening 15 in the top of the cage, the upper end of the rod 14 being cut away to form a notch 16, in which the said end of the tripping lever 11 is secured, the lower end of the rod 14 being similarly notched at 17 for the purpose of engaging with the longitudinal bar 18 secured within the cage. On the lower end of the rod 14 is provided a rod 19, preferably made of metal, having a hook 20 formed on the lower free end thereof, upon which a suitable bait (not shown) is adapted to be secured.

My invention is operated as follows; For the purpose of illustration, the views shown in the drawings show the trap as set, and we will assume that the hook 20 has been baited. The animal is attracted and induced to partially enter the cage by the bait, and in the effort to obtain possession of the bait, the trigger 14 will be easily thrown, this being accomplished in either of the following manners; by pulling the rod 19 toward the door way 2, the trigger rod 14 by reason of it being fulcrumed against the bar 18 is readily made to disengage with the end of the tripping lever 11 secured in its notched end 16, thereby releasing the tripping lever 11, which in turn releases the pin 10, on the lever 2, and the lever 2 by reason of the weight 7 thereon will descend rapidly and the animal caught between the curved portion 21 of the lever 2, and the sill 22 of the door way 1, the weight 7 on the lever 2 being sufficiently heavy to cause the lever to descend with such force as to either kill the animal outright or cause it to be securely held until removed. By pushing the rod 19 in the direction opposite to the one just described, the notched end 17 of the rod 14 is disengaged from under the bar 18, and by reason of the pressure of the weight and the lever 2 on the tripping lever 11 through the medium of the pin 10, the rod 14 as soon as released at its notched end 17 from under the bar 18, will be suddenly lifted upward, and the end of the lever 11 be disengaged by the notch 16 on the upper end of the rod 14, with the result that the lever 2 will be made to descend in the manner just described.

It will be observed that the floor 23 has been extended as shown at 23′ on the side of the cage on which the weight 7 is suspended. It is obvious that this is done for the purpose of equalizing the weight of the cage and weight and maintaining them in a balance, and thereby prevent the possibility of the cage being overturned where a very heavy weight is desired to be used, and in cases where the opportunity does not present itself for securing the cage on a suitable foundation by other means, that it can not possibly be overturned.

Weights of various sizes may be used as desired to meet the requirements incident to the successful trapping of animals of various kinds, and the portion 21 of the lever 2, as may likewise the sill 22, be made with a sharp or pronged edge for the purpose of beheading or otherwise killing the animal trapped.

I am aware that slight changes and alterations may be resorted to in the form and arrangement of the several parts herein described, without departing from the spirit and scope of my invention, hence I do not wish to limit myself to the exact construction as herein set forth, but;

Having fully described my invention, what I claim as new and desire to secure by Letters Patent, is;

An animal trap, comprising a cage having a door-way in one side and an aperture through the top, a lever pivoted to said cage adjacent to said door-way, adapted to move vertically across said door-way and to coöperate with the sill thereof to trap the animal therebetween, the free end of said lever being weighted, extended beyond and above the top of the cage and provided with a horizontal pin, a tripping lever lying in parallel relation with the above mentioned lever and pivoted intermediate its ends upon the top of the cage at one side, one end of which extends beyond the side of the cage and is adapted to engage said pin, and a trigger rod having one side notched adjacent its ends and provided with a bait-hook accessible only through the door-way and adapted to engage said tripping lever, extend through the aperture in the top, and to engage a fixed part on the interior of the cage.

In testimony whereof I affix my signature in presence of two witnesses.

HENRY O. REESE.

Witnesses:
E. WALTON BREWINGTON,
MARY M. MAGRAW.

---

Copies of this patent may be obtained for five cents each, by addressing the "Commissioner of Patents, Washington, D. C."